US012219292B2

(12) United States Patent
Yamazaki

(10) Patent No.: US 12,219,292 B2
(45) Date of Patent: Feb. 4, 2025

(54) REMOTE-MEETING SYSTEM, REMOTE-MEETING METHOD, AND REMOTE-MEETING PROGRAM

(71) Applicant: KONICA MINOLTA INC., Tokyo (JP)

(72) Inventor: Kohei Yamazaki, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 187 days.

(21) Appl. No.: 17/891,730

(22) Filed: Aug. 19, 2022

(65) Prior Publication Data

US 2023/0063393 A1 Mar. 2, 2023

(30) Foreign Application Priority Data

Aug. 24, 2021 (JP) ................. 2021-136652

(51) Int. Cl.
*H04N 7/15* (2006.01)
*H04L 12/18* (2006.01)
(52) U.S. Cl.
CPC ......... *H04N 7/152* (2013.01); *H04L 12/1818* (2013.01); *H04L 12/1822* (2013.01); *H04N 7/155* (2013.01)
(58) Field of Classification Search
CPC .......... H04N 7/152; H04N 7/155; H04N 7/15; H04L 12/1818; H04L 12/1822; H04L 12/18
See application file for complete search history.

(56) References Cited

U.S. PATENT DOCUMENTS

| 2009/0316872 A1* | 12/2009 | Wolf | H04M 3/567 379/202.01 |
| 2014/0282586 A1* | 9/2014 | Shear | H04L 47/70 718/104 |

FOREIGN PATENT DOCUMENTS

| JP | 2007-325063 A | 12/2007 | |
| JP | 2007325063 | * 12/2007 | ............. G06F 13/00 |

* cited by examiner

*Primary Examiner* — Yosef K Laekemariam
(74) *Attorney, Agent, or Firm* — Squire Patton Boggs (US) LLP

(57) ABSTRACT

A remote-meeting system that allows a plurality of participants to participate in a remote meeting, the remote-meeting system includes a hardware processor that: determines group information related to a plurality of groups, each of which including a plurality of two or more the participants; acquires a meeting state indicating a state of a meeting held by each of a plurality of the groups; generates change information obtained by changing the group information on the basis of the meeting state of each of a plurality of the groups; and notifies of a part changed from the group information.

11 Claims, 9 Drawing Sheets

REMOTE-MEETING SYSTEM, REMOTE-MEETING METHOD, AND REMOTE-MEETING PROGRAM

The entire disclosure of Japanese patent Application No. 2021-136652, filed on Aug. 24, 2021, is incorporated herein by reference in its entirety.

BACKGROUND

Technological Field

The present invention relates to a remote-meeting system, a remote-meeting method, and a remote-meeting program, and more particularly, to a remote-meeting system having a breakout room function, a remote-meeting method executed in the remote-meeting system, and a remote-meeting program for causing a computer to execute the remote-meeting method.

Description of the Related Art

In recent years, remote-meeting systems with which a plurality of participants at distant locations holds a meeting via a computer have become widespread. In addition, technology for supporting progress of a remote meeting has been developed. For example, Japanese Patent Application Laid-Open No. 2007-325063 discloses a remote-meeting system in which a plurality of spots is connected via a network, the remote-meeting system including servers at the respective spots, the servers being connected via the network, and display devices connected to the servers, in which the severs include a recorder that records, for each participant of a meeting, data regarding speaking by a participant, and a first display controller that displays, on the display devices of a facilitator of the meeting, or a specific or all of the participants, data recorded by the recorder at each of the spots.

Meanwhile, there is known a breakout room function with which participants using a remote-meeting system go into a plurality of small groups to have meetings separately. In the remote-meeting system described in Japanese Patent Application Laid-Open No. 2007-325063, while a breakout room function can facilitate meetings for each of a plurality of groups, there may be a difference in state of the meetings among the groups. For this reason, there may be a great difference in ending time or achievement of the meetings among the groups.

SUMMARY

One object of the present invention is to provide a remote-meeting system capable of adjusting progress of meetings so that the meetings proceed in a balanced manner among a plurality of groups.

Another object of the present invention is to provide a remote-meeting method capable of adjusting progress of meetings so that the meetings proceed in a balanced manner among a plurality of groups.

Still another object of the present invention is to provide a remote-meeting program capable of adjusting progress of meetings so that the meetings proceed in a balanced manner among a plurality of groups.

To achieve at least one of the abovementioned objects, according to an aspect of the present invention, there is provided a remote-meeting system that allows a plurality of participants to participate in a remote meeting, and the remote-meeting system reflecting one aspect of the present invention comprises a hardware processor that: determines group information related to a plurality of groups, each of which including a plurality of two or more the participants; acquires a meeting state indicating a state of a meeting held by each of a plurality of the groups; generates change information obtained by changing the group information on the basis of the meeting state of each of a plurality of the groups; and notifies of a part changed from the group information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
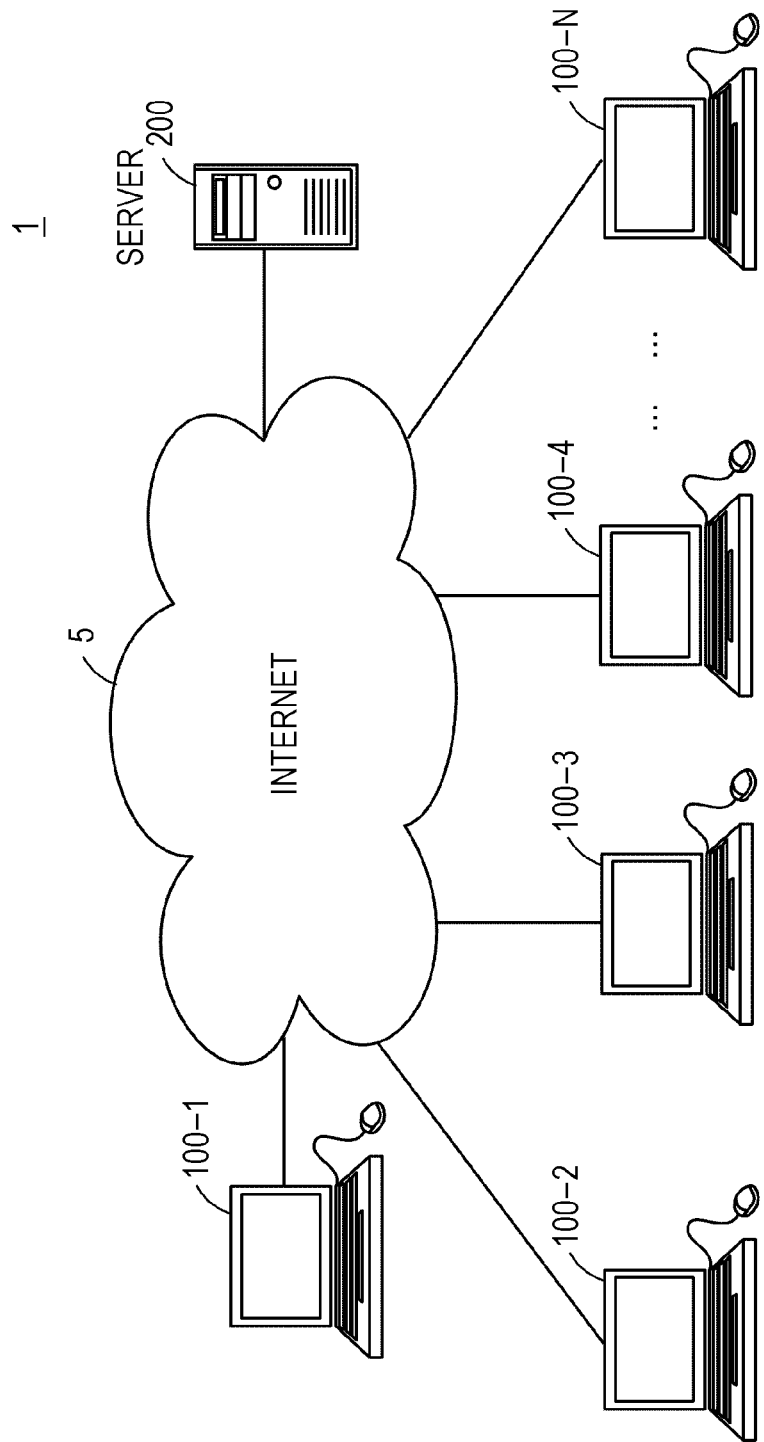
FIG. 1 is a diagram illustrating an example of a system configuration of a remote-meeting system according to an embodiment of the present invention.

Hereinafter, one or more embodiments of the present invention will be described with reference to the drawings. However, the scope of the invention is not limited to the disclosed embodiments. In the following description, the same components are denoted by the same reference numerals. Their names and functions are also the same. Therefore, detailed descriptions thereof will not be repeated.

FIG. 1 is a diagram illustrating an example of a system configuration of a remote-meeting system according to an embodiment of the present invention. With reference to FIG. 1, the remote-meeting system 1 includes a server 200 and personal computers (hereinafter referred to as "PCs") 100-1, 100-2, 100-3, and 100-4 to 100-N. In this regard, N is a positive integer, and is 5 or more. The server 200 and the PCs 100-1 to N are connected to an Internet 5 and can communicate with one another.

Each of the PCs 100-1 to N includes a camera, a microphone that collects sound, and a speaker that outputs sound. Each of the PCs 100-1 to N is a general computer, and has identical main hardware configuration and functions. Therefore, here, the PCs 100-1 to N are collectively referred to as a PC 100.

Instead of each of the PCs 100-1 to N, an information communication device such as a personal digital assistance (PDA) or a smartphone may be used as long as the device includes a camera, a microphone, a speaker, and a communication function. The Internet 5 may be another network as long as the server 200 and the PCs 100-1 to N can communicate with one another. The network may be, for example, a local area network (LAN) or a wide area network (WAN).

Figure 2:
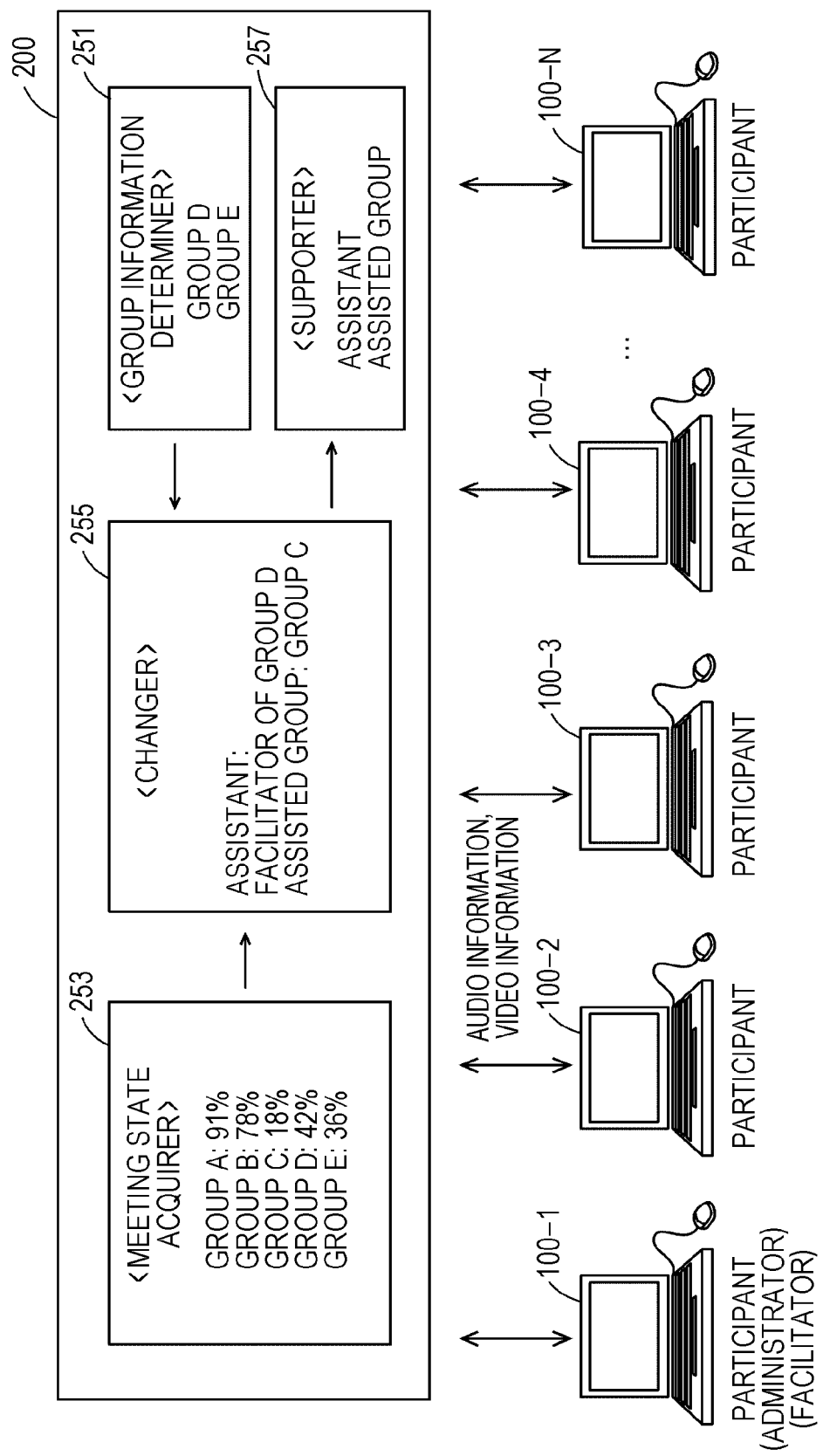
FIG. 2 is a diagram illustrating an example of an overview of the remote-meeting system according to an embodiment of the present invention.

FIG. 2 is a diagram illustrating an example of an overview of the remote-meeting system according to an embodiment of the present invention. With reference to FIG. 2, with the remote-meeting system 1, a participant of a meeting participates in the meeting by operating any one of the PCs 100-1 to N. The remote-meeting system 1 according to the present embodiment will be described taking an example where a plurality of participants of the meeting includes an administrator who hosts the meeting and at least one facilitator who assists progress of the meeting. In a case where a meeting is held by each of a plurality of groups using a breakout room function in the remote-meeting system 1, the facilitator belongs to any one of the groups and plays a role of assisting progress of the meeting held by the group. The administrator, the facilitator, and the participants are predetermined, and the participants and the facilitator are set in the remote-meeting system 1 by the administrator. Here, a case where a participant who operates the PC 100-1 is the administrator and is the facilitator will be described as an example.

A program required for participating in the meeting is installed in each of the PCs 100-1 to N, and the meeting is held by each of the PCs 100-1 to N communicating with the server 200. Instead of a program dedicated to communicating with the server 200, the program installed in each of the PCs 100-1 to N may be a general browser program in a case where the server 200 provides a web service.

The server 200 achieves a remote-meeting system by executing a remote-meeting program. The server 200 communicates with the PCs 100-1 to N, and transmits data received from each of the PCs 100-1 to N to each of the other PCs 100-1 to N.

The data transmitted and received between each of the PCs 100-1 to N and the server 200 includes audio information indicating audio, video information indicating video, and application data. The data transmitted and received between each of the PCs 100-1 to N and the server 200 may be compressed or uncompressed data.

The server 200 integrates data to be transmitted to each of the PCs 100-1 to N. For example, the server 200 transmits, to all of the PCs 100-1 to N, data of audio received from each of the PCs 100-1 to N. For the video information, the server 200 aggregates data of video received from each of the PCs 100-1 to N, and transmits the video data to each of the PCs 100-1 to N.

The server 200 determines and transmits video and application data to be transmitted in response to a request from each of the PCs 100-1 to N. Therefore, images displayed on the PCs 100-1 to N may be the same or different. Each of the PCs 100-1 to N may process and display the video information received from the server 200. In this case, the video information is not necessary to be processed in the server 200, and thus load is reduced.

The server 200 stores group information related to a plurality of groups A to E, and determines a meeting state of each of the plurality of groups. The group information is information that identifies a plurality of participants belonging to each of the plurality of groups A to E. The server 200 determines the meeting state of each of the plurality of groups A to E on the basis of audio information and video information that are received from each of the PCs 100-1 to N. Here, there is described a case where it is determined that the meeting state of the group A is 91%, the meeting state of the group B is 78%, the meeting state of the group C is 18%, the meeting state of the group D is 42%, and the meeting state of the group E is 36%.

The server 200 determines an assistant and an assisted group on the basis of the meeting state of each of the plurality of groups A to E, and provides a notification. On the basis of facilitator information indicating which of the participants is a facilitator, the server 200 acquires that the group D and the group E have a facilitator. The server 200 determines the group D having a best meeting state among the groups D and E having a facilitator to be a support group, and determines the facilitator belonging to the support group to be the assistant. Further, the server 200 determines the group C having a least best meeting state among the groups A to C having no facilitator to be the assisted group. Then, the server 200 notifies the assistant or the administrator of a message prompting the assistant to move to the assisted group.

Figure 3:
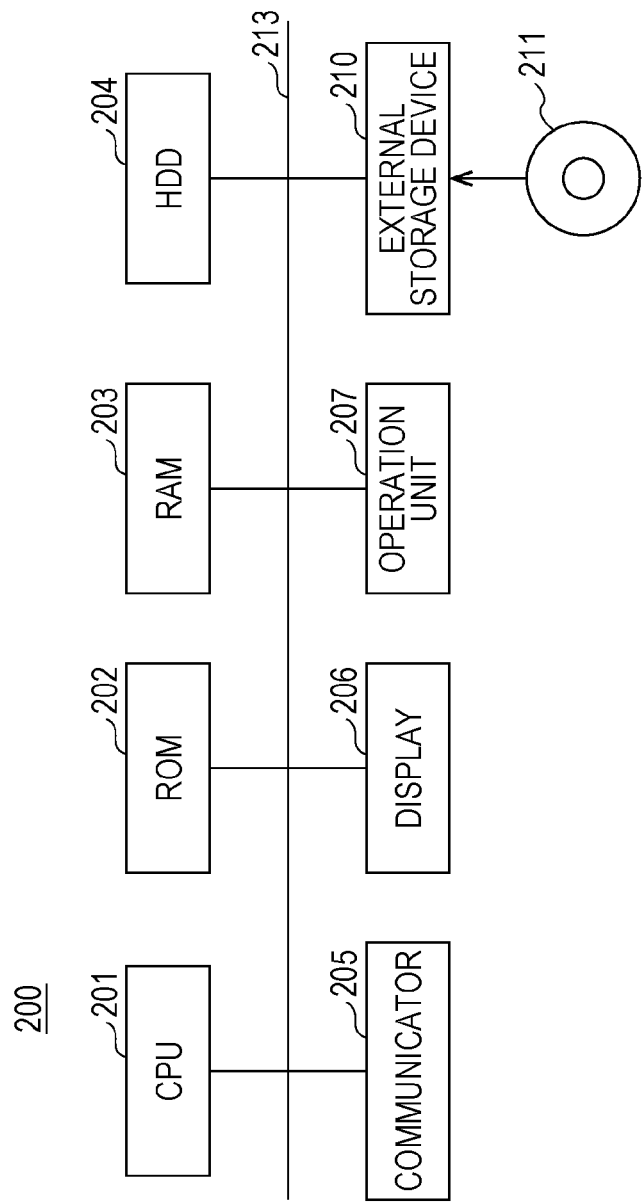
FIG. 3 is a block diagram illustrating an example of a hardware configuration of a server.

FIG. 3 is a block diagram illustrating an example of a hardware configuration of a server. With reference to FIG. 3, the server 200 is a computer that performs arithmetic processing, and includes a central processing unit (CPU) 201 for controlling an entire server 200, a read only memory (ROM) 202 that stores a program to be executed by the CPU 201, a random access memory (RAM) 203 used as a work area of the CPU 201, a hard disk drive (HDD) 204 that stores data in a nonvolatile manner, a communicator 205 that connects the CPU 201 to the Internet 5, a display 206 that displays an image, an operation unit 207 that receives input of operation, and an external storage device 210, which are all connected to a bus 213.

The communicator 205 is an interface for connecting the server 200 to the Internet 5. Therefore, via the communicator 205, the CPU 201 can communicate with the PCs 100-1 to 100 N connected to the Internet 5.

A compact disk read only memory (CD-ROM) 211 is inserted in the external storage device 210. The CPU 201 controls the external storage device 210 to read data stored in the CD-ROM 211.

In the present embodiment, the CPU 201 executes a program stored in the ROM 202 or in the HDD 204. The CPU 201 may control the external storage device 210 to read, from the CD-ROM 211, the program to be executed by the CPU 201, store the read program in the RAM 203, and execute the program.

The CPU 201 downloads a program from a computer connected to the Internet 5 and stores the program in the HDD 204. In a case where the computer connected to the Internet 5 writes the program to the HDD 204, the program is stored in the HDD 204. The CPU 201 may load the program stored in the HDD 204 into the RAM 203 and execute the program.

A recording medium that stores the program to be executed by the CPU 201 is not limited to the CD-ROM 211, and may be a medium such as a flexible disk, a cassette tape, an optical disk (magnetic optical disc (MO)/mini disc (MD)/digital versatile disc (DVD)), an IC card, an optical card, or a semiconductor memory such as a mask ROM or an erasable programmable ROM (EPROM). The program here includes not only a program that can be directly executed by the CPU 201 but also a source program, a compressed program, an encrypted program, and the like.

Figure 4:
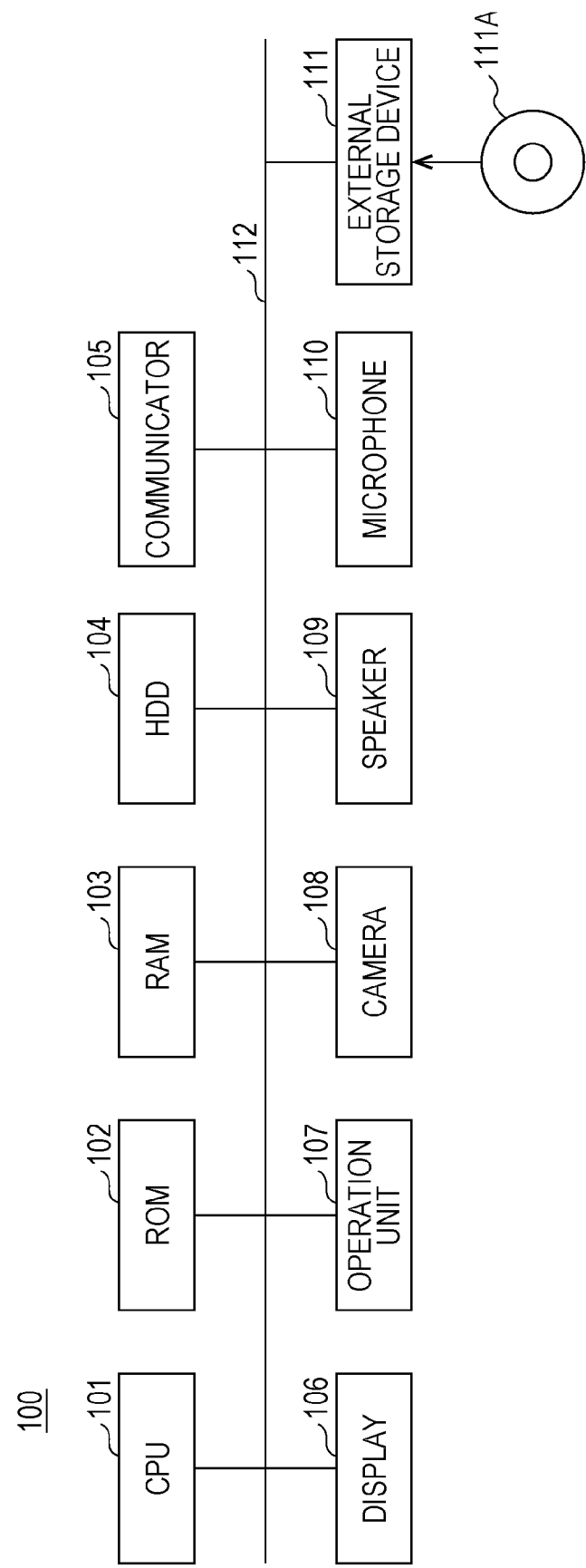
FIG. 4 is a block diagram illustrating an example of a hardware configuration of a PC.

FIG. 4 is a block diagram illustrating an example of a hardware configuration of a PC. With reference to FIG. 4, the PC 100 is a computer that performs arithmetic processing, and includes a CPU 101 for controlling an entire PC 100, a ROM 102 that stores a program to be executed by the CPU 101, a RAM 103 used as a work area of the CPU 101, an HDD 104 that stores data in a nonvolatile manner, a communicator 105 that connects the CPU 101 to the Internet 5, a display 106 that displays an image, an operation unit 107 that receives input of operation by a participant as a user, a camera 108 that captures an image of the participant, a speaker 109 that outputs audio, a microphone 110 that collects sound of an operator, and an external storage device 111, which are all connected to a bus 112.

A CD-ROM 111A is inserted in the external storage device 111. The CPU 101 controls the external storage device 111 to read the data stored in the CD-ROM 111A.

A module in which at least two of the camera 108, the speaker 109, and the microphone 110 are integrated may be connected to the PC 100. The module includes, for example, a headset in which the speaker 109 and the microphone 110 are integrated.

Figure 5:
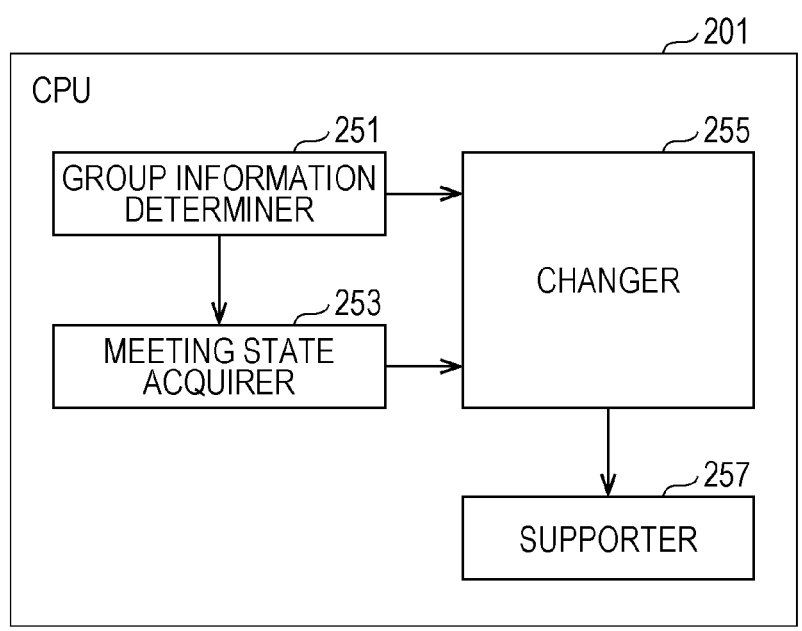
FIG. 5 is a diagram illustrating an example of functions of a CPU included in a server according to the present embodiment.

FIG. 5 is a diagram illustrating an example of functions of a CPU included in a server according to the present embodiment. The functions illustrated in FIG. 5 are functions achieved by the CPU 201 included in the server 200 when the CPU 201 executes a remote-meeting program stored in the ROM 202, the HDD 204, or the CD-ROM 211. With reference to FIG. 5, the CPU 201 includes a group information determiner 251, a meeting state acquirer 253, a changer 255, and a supporter 257.

The group information determiner 251 determines group information related to a plurality of groups. The group information is information that defines a plurality of groups and participants belonging to the respective groups. Here, the group information includes a participant record in which, for each participant, participant identification information for identifying the participant and group identification information for identifying a group are associated with each other. A meeting participant belongs to any one of the plurality of groups. The plurality of groups is determined by the administrator who is any one of the plurality of participants. Here, a case where the participant who operates the PC 100-1 is the administrator will be described as an example. The administrator grasps the plurality of participants in advance, and inputs participant identification information and group identification information for each of the plurality of participants to the remote-meeting system via the PC 100-1. The group information determiner 251 acquires the group information input to the PC 100-1 by the administrator, and outputs the group information to the meeting state acquirer 253 and the changer 255. Note that a case where the administrator inputs the group information to the PC 100-1 will be described as an example in the present embodiment. However, the group information determiner 251 may generate the group information on the basis of information of the plurality of participants. For example, the plurality of participants may be identified from convocation notice for the meeting, reply mails, and the like, and the plurality of participants may be classified into groups on the basis of an attribute thereof. The attribute includes an organization to which a participant belongs, a work history, a specialized field, and the like.

The meeting state acquirer 253 acquires a meeting state indicating a state of a meeting held by each of the plurality of groups. The meeting state is determined by a state of each of the plurality of participants belonging to the group. The state of a participant is determined on the basis of audio of the participants and/or images obtained by capturing images of the faces of the participants. The meeting state acquirer 253 outputs a meeting state of each of the plurality of groups to the changer 255. Meeting information is information that indicates a greater value as a state of a meeting in a group is better.

The meeting state acquirer 253 acquires, from each of the PCs 100, and 100A to 100N operated by the plurality of participants, audio information indicating audio of the participants and video information obtained by capturing images of the faces of the participants. Each of the PCs 100-1 to N transmits, to the server 200, audio information obtained by converting sound collected by the microphone 110 into a digital signal, and video information obtained by converting video obtained by capturing an image of the face of the participant with the camera 108 into a digital signal. The meeting state acquirer 253 associates the audio information and video information, which are received by the communicator 205 from each of the PCs 100-1 to N, with each of the participants, and stores the information in the HDD 204. The audio information and the video information may be stored in association with each of the PCs 100-1 to N, or may be stored in association with each of the participants who operate the PCs 100-1 to N. The participant is authenticated and identified by the server 200 at a stage where the participant logs in to the remote-meeting system by operating any one of the PCs 100-1 to N.

The meeting state is indicated with a first state index and a second state index. The first state index and the second state index have different evaluation criteria. The meeting state acquirer 253 determines, for each group, the first state index and second state index of the group on the basis of a state of each of the plurality of participants belonging to the group.

In the present embodiment, the first state index is an index indicating a level of activeness in a meeting, and the second state index is an index indicating a level of satisfaction of each of the participants of the meeting. The first state index indicates a greater value as the level of activeness in the meeting increases. The second state index indicates a greater value as the level of satisfaction of each of the participants of the meeting increases.

Specifically, a case where the first state index is a speaking rate of a group will be described as an example. The speaking rate is indicated by a proportion of speaking time per unit time. Speaking time is obtained from audio information of the participant. A sum of speaking rates of the plurality of participants belonging to a group is defined as the first state index of the group. Note that, in a case where a speaking rate of one participant is higher than speaking rates of other participants, it cannot be said that the level of activeness of the group is high. Therefore, the first state index of the group may be a value obtained by adjusting the sum of the speaking rates of the plurality of participants according to unevenness of the speaking rates of the plurality of participants. For example, the first state index of the group may be a value obtained by dividing the sum by a difference between a greatest value of a speaking rate of each of the plurality of participants (or an average speaking rate of top several participants) and an overall average value.

Next, a case where the second state index is a satisfaction level of a group will be described as an example. The satisfaction level is a value obtained by quantifying a level of a feeling of satisfaction or agreement of a participant. For example, by causing artificial intelligence to learn expression of and satisfaction levels of participants that appear in video information of the participants, a satisfaction level of a participant can be determined from video information of the participant. An average of satisfaction levels of the plurality of participants belonging to a group is defined as the second state index of the group. Note that, in a case where there is a great deal of unevenness in the satisfaction levels between the participants, it cannot be said that the satisfaction level of the group is high. Therefore, the second state index of the group may be a value obtained by adjusting the average of the satisfaction levels of the plurality of participants according to unevenness of the satisfaction levels among the plurality of participants.

The changer 255 generates change information by changing group information on the basis of the meeting state. The changer 255 outputs a changed part different between the change information and the group information to the supporter 257. The changer 255 changes the group information by using the first state index of the meeting information in a first period, and changes the group information by using the second state index of the meeting information in a second period. The second period is a period after the first period. The second period is a period from a predetermined time before an end time of a target meeting to the end time. The first period is an arbitrary period excluding the second period in a period from the start time to the end time of the target meeting. For example, in a case where the predetermined time is 30 minutes, the first period is a period from the start time to 30 minutes before the end time, and the second period is a period from a time 30 minutes before the end time to the end time.

The changer 255 judges whether or not to change the group information at predetermined time intervals. At the predetermined time intervals, the changer 255 compares the meeting information of each of the plurality of groups with a predetermined threshold value, and, in a case where meeting information of any one of the plurality of groups is equal to or less than a threshold value TH, judges that the group information is to be changed. if a timing for the judgement is in the first period, the changer 255 judges that the group information is to be changed in a case where the first state index of any one of the plurality of groups is equal to or less than a first threshold value TH1. if the timing for the judgement is in the second period, the changer 255 judges that the group information is to be changed in a case where the second state index of any one of the plurality of groups is equal to or less than a second threshold value TH2.

As described above, the changer 255 changes the group information by using the first state index and the first threshold value TH1 or the second state index and the second threshold value TH2. Procedure for the processing is the same between the case where the changer 255 changes the group information by using the first state index and the first threshold value TH1 and the case where the changer 255 changes the group information by using the second state index and the second threshold value TH2. Hereinafter, the first state index and the second state index are collectively referred to as a state index, and the first threshold value TH1 and the second threshold value TH2 are collectively referred to as a threshold value.

When changing the group information, the changer 255 determines at least one assistant among the plurality of participants on the basis of the meeting state of each of the plurality of groups. When changing the group information, the changer 255 determines, on the basis of the meeting state of each of the plurality of groups, an assisted group different from the group to which the assistant belongs before the change, among the plurality of groups. The changer 255 generates change information in which the group information is changed to have a group organization in which the assistant belongs to the assisted group.

Specifically, the changer 255 determines, as the assistant, a facilitator belonging to a support group having a highest state index among one or more groups having a facilitator of a plurality of groups. The facilitator is a participant who plays a role of controlling progress of the meeting in the group, and is determined in advance from the plurality of participants. It is only required that there be one or more facilitators. The changer 255 does not determine the group having the facilitator already determined as the assistant to be the support group, even if the group is among one or more groups having a facilitator. In other words, the changer 255 determines, as the assistant, a facilitator belonging to a support group having a highest state index among one or more groups having a facilitator not determined as an assistant, among one or more groups having a facilitator. Note that, even if a facilitator belonging to the group having the highest state index among the one or more groups having a facilitator is the facilitator already determined as the assistant, the changer 255 may determine the group as the support group.

The changer 255 determines, as the assisted group, a group having a lowest state index among one or more groups having no facilitator of a plurality of groups. The changer 255 generates change information in which the group information has a group organization in which the assistant belongs to the assisted group. The changer 255 outputs the group information and the change information to the supporter 257. The changer 255 may generate the change information in which the group organization has any one of a plurality of participants belonging to the assisted group to be the support group. In this case, the number of participants belonging to each of the plurality of groups can be prevented from changing.

The supporter 257 compares the change information with the group information, and notifies the participant of a different changed part. Specifically, the supporter 257 compares the change information with the group information, and determines the assistant and the assisted group as the changed parts. The supporter 257 notifies the participant of a message prompting the assistant to move to the assisted group.

For example, the supporter 257 causes the PCs 100-1 to N to display a message. The supporter 257 may provide notification only to the assistant. In this case, the supporter 257 displays a message on a device operated by the assistant among the PCs 100-1 to N. The assistant who views the message can change the group organization so that the assistant belongs to the assisted group. In addition, the message may be notified to the administrator who administers the meeting. In this case, the supporter 257 displays a message on a device operated by the administrator among the PCs 100-1 to N. The administrator who views the message can change the group organization so that the assistant belongs to the assisted group. In a case where the group organization is changed, the assistant is present in the assisted group. Therefore, it is expected that the meeting state will improve due to active discussion in the meeting. Therefore, by the supporter 257 notifying of the message, it is possible to adjust progress of meetings to proceed in a balanced manner among the plurality of groups.

In a case where the group organization is changed by the administrator or the assistant, the group information determiner 251 acquires new group information after the group organization is changed by the administrator. In a case where the group information is changed, a set of the group information before and after the change and state information is stored in the HDD 204. Further, the state information after the set of the group information before and after the change and the state information is stored is stored in the HDD 204. As a result, the set of the group information and the state information before the change and the set of the group information and the state information after the change are stored in the HDD 204. A threshold value for judging whether or not to change the group information or timing at which the assistant moves may be learned by artificial intelligence on the basis of the set of the group information before and after the change and the state information. The threshold value for judging whether or not to change the group information is, for example, the first threshold value TH1 for the first state index and the second threshold value TH2 for the second state index.

Figure 6:
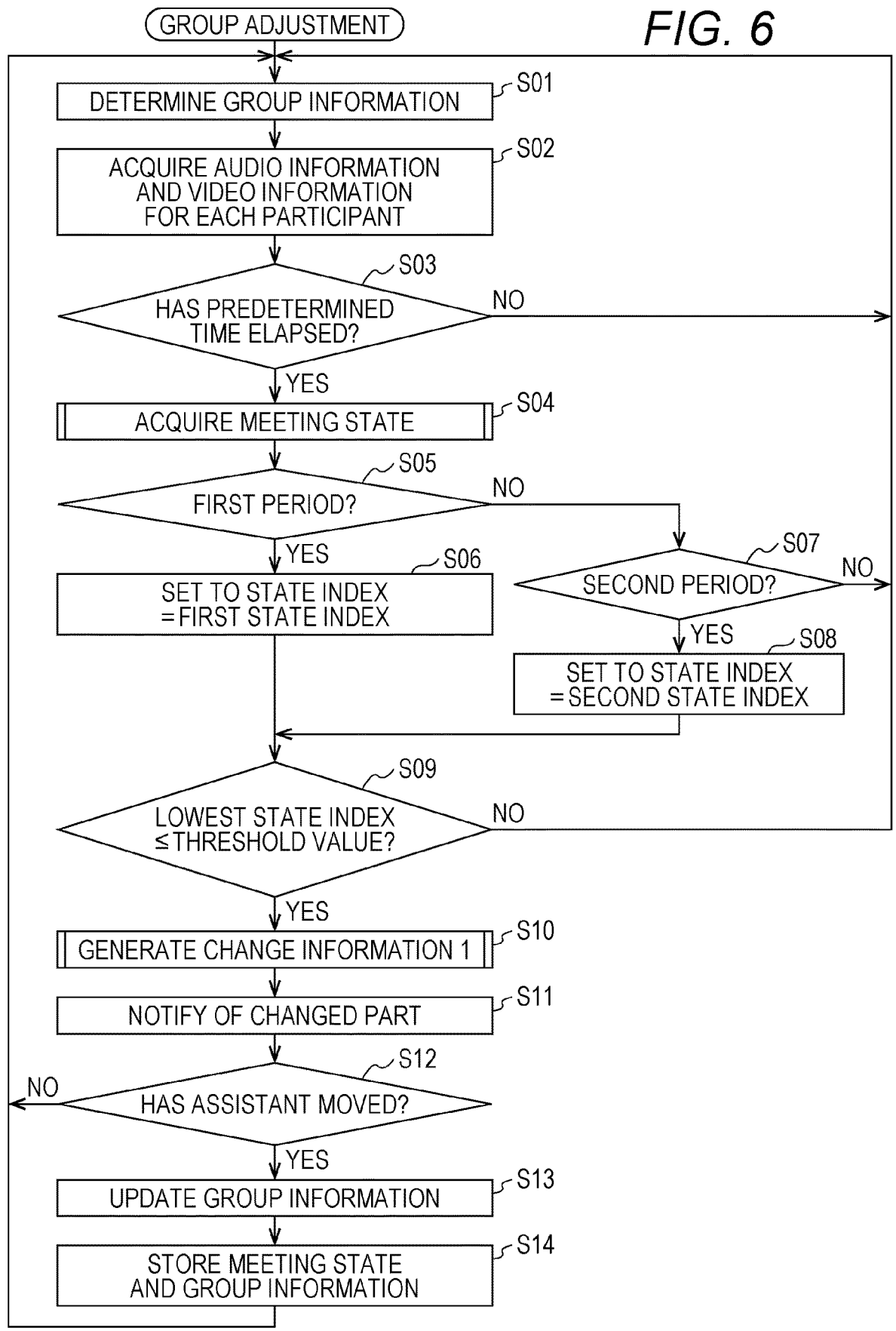
FIG. 6 is a flowchart illustrating an example of a flow of group adjustment processing.

FIG. 6 is a flowchart illustrating an example of a flow of group adjustment processing. The group adjustment processing is processing executed by the CPU 201 included in the server 200 when the CPU 201 executes the remote-meeting program stored in the ROM 202, the HDD 204, or the CD-ROM 211. With reference to FIG. 6, the CPU 201 included in the server 200 determines group information (step S01), and the processing proceeds to step S02. There is generated group information including a participant record in which, for each participant, participant identification information for identifying the participant and group identification information for identifying a group are associated with each other. The group information is determined by an administrator who is any one of meeting participants, and the group information is input to the remote-meeting system 1. For example, in a case where the administrator operates the PC 100, in a case where the administrator inputs group information including a participant record for each of a plurality of participants to the remote-meeting system via the PC 100-1, the group information received from the PC 100 is acquired.

In step S02, audio information and video information are acquired for each participant, and the processing proceeds to step S03. The CPU 201 controls the communicator 205 to acquire audio information indicating audio of the participant, the audio being received by the communicator 205 from each of the PCs 100-1 to N, and video information obtained by capturing an image of the face of the participant. The audio information and the video information are stored in the HDD 204 in association with the participant.

In step S03, it is judged whether or not a predetermined time has elapsed. It is judged whether or not the predetermined time has elapsed since execution of the group adjustment processing, or the predetermined time has elapsed since execution of step S03 in past. If the predetermined time has elapsed, the processing proceeds to step S04, and if not, the processing returns to step S01. The processing in and after step S04 is executed at predetermined time intervals.

In step S04, the meeting state acquisition processing is executed, and the processing proceeds to step S05. Although details of the meeting state acquisition processing will be described later, the meeting state acquisition processing is processing of calculating a state index. The state index includes a first state index, and a second state index having an evaluation level different from an evaluation level of the first state index. In the present embodiment, the first state index is an index that indicates a greater value as a level of activeness in a meeting increases, and the first state index is a speaking rate in a group. The second state index is an index indicating a level of satisfaction of each of the meeting participants, and is a value obtained by quantifying a level of a feeling of satisfaction or agreement. The second state index causes artificial intelligence to learn images of faces of and satisfaction levels of participants, and the satisfaction level is determined from expression that can be read from the face of a participant.

In step S05, it is judged whether or not current time is within the first period. If the current time is within the first period, the processing proceeds to step S06, and if not, the processing proceeds to step S07. In step S06, the state index is set to the first state index, and the processing proceeds to step S10. In step S07, it is judged whether or not current time is within the second period. If the current time is within the second period, the processing proceeds to step S08, and if not, the processing returns to step S01. The second period is a period after the first period. In step S08, the state index is set to the second state index, and the processing proceeds to step S09.

In step S09, it is judged whether or not a lowest state index is equal to or less than a threshold value. In a case where the first state index is set for the state information, it is judged whether or not the lowest first state index is equal to or less than the first threshold value TH1. In a case where the second state index is set for the state information, it is judged whether or not the lowest second state index is equal to or less than the second threshold value TH2. If the lowest state index is equal to or less than the threshold value, the processing proceeds to step S10, and if not, the processing returns to step S01.

In step S10, change information generation processing is executed, and the processing proceeds to step S11. Although details of the change information generation processing will be described later, the change information generation processing is processing of generating change information in which the group information is changed on the basis of the state information. At least one set of an assistant and an assisted group is determined by executing the change information generation processing. In step S11, a changed part is notified, and the processing proceeds to step S12. The changed part is a part different between the change information and the group information. Specifically, the participants are notified of a message prompting the assistant to move to the assisted group. For example, the message is displayed on the PCs 100-1 to N operated by the participants. The message may be notified not to all of the participants but to the assistant or the administrator. The assistant or the administrator becomes able to set, for the remote-meeting system, operation of changing the group having the assistant to the assisted group. In a case where the artificial intelligence determines the timing at which the assistant moves, the assistant is notified of the timing.

In step S12, it is judged whether or not the assistant has moved to the assisted group. If the assistant has moved to the assisted group, the processing proceeds to step S13, and if not, the processing returns to step S01. In step S13, the group information is updated, and the processing proceeds to step S14. The group information is changed to have a group organization in which the assistant belongs to the assisted group. In step S14, the meeting state and the group information are stored in the HDD 204, and the processing returns to step S01.

Figure 7:
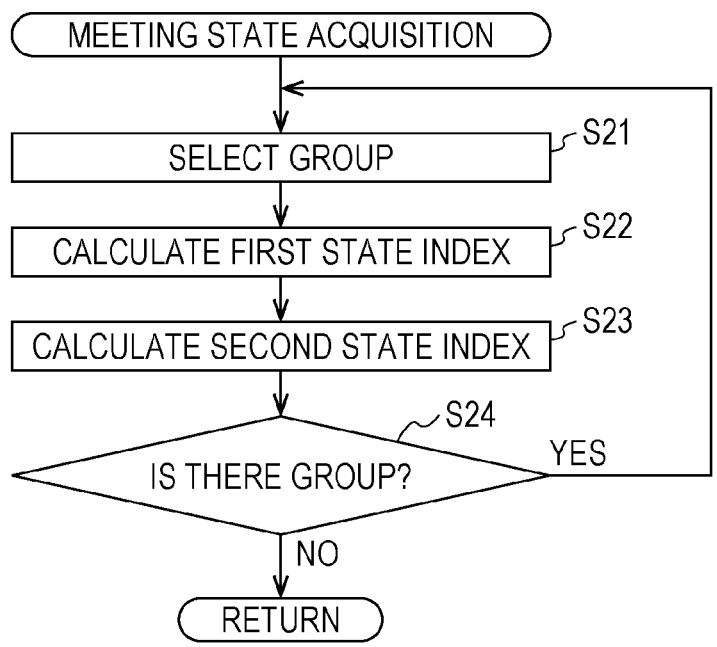
FIG. 7 is a flowchart illustrating an example of a flow of meeting state acquisition processing.

FIG. 7 is a flowchart illustrating an example of a flow of the meeting state acquisition processing. The meeting state acquisition processing is processing executed in step S04 of the group adjustment processing. With reference to FIG. 7, a group to be processed is selected (step S21), and the processing proceeds to step S22. A group of which meeting state is to be acquired is selected from the plurality of groups defined by the group information.

In step S22, the first state index is calculated, and the processing proceeds to step S23. The first state index is an index indicating a level of activeness in a meeting, and is a speaking rate in a group. The speaking rate is indicated by a proportion of speaking time per unit time. The speaking rate of each of the plurality of participants is calculated on the basis of the audio information acquired from each of the PCs 100-1 to N. The first state index of each of the plurality of groups is a sum of speaking rates of the plurality of participants belonging to the group.

In step S23, the second state index is calculated, and the processing proceeds to step S24. The second state index is an index indicating a level of satisfaction of each of the participants of the meeting, and is the satisfaction level in the group. The satisfaction level is a value obtained by quantifying a level of a feeling of satisfaction or agreement of a participant. On the basis of the video information acquired from each of the PCs 100-1 to N, a satisfaction level of each of the participants is calculated. For example, it is possible to determine a satisfaction level from the face of a participant by causing artificial intelligence to learn. The second state index of each of the plurality of groups is an average of satisfaction levels of the plurality of participants belonging to the group.

In step S24, it is judged whether or not there is a group that has not been selected as a group to be processed. If there is an unselected group, the processing returns to step S21, and if not, the processing returns to the group adjustment processing. As a result, the first state index and the second state index are calculated as a meeting state of each of the plurality of groups defined by the group information.

Figure 8:
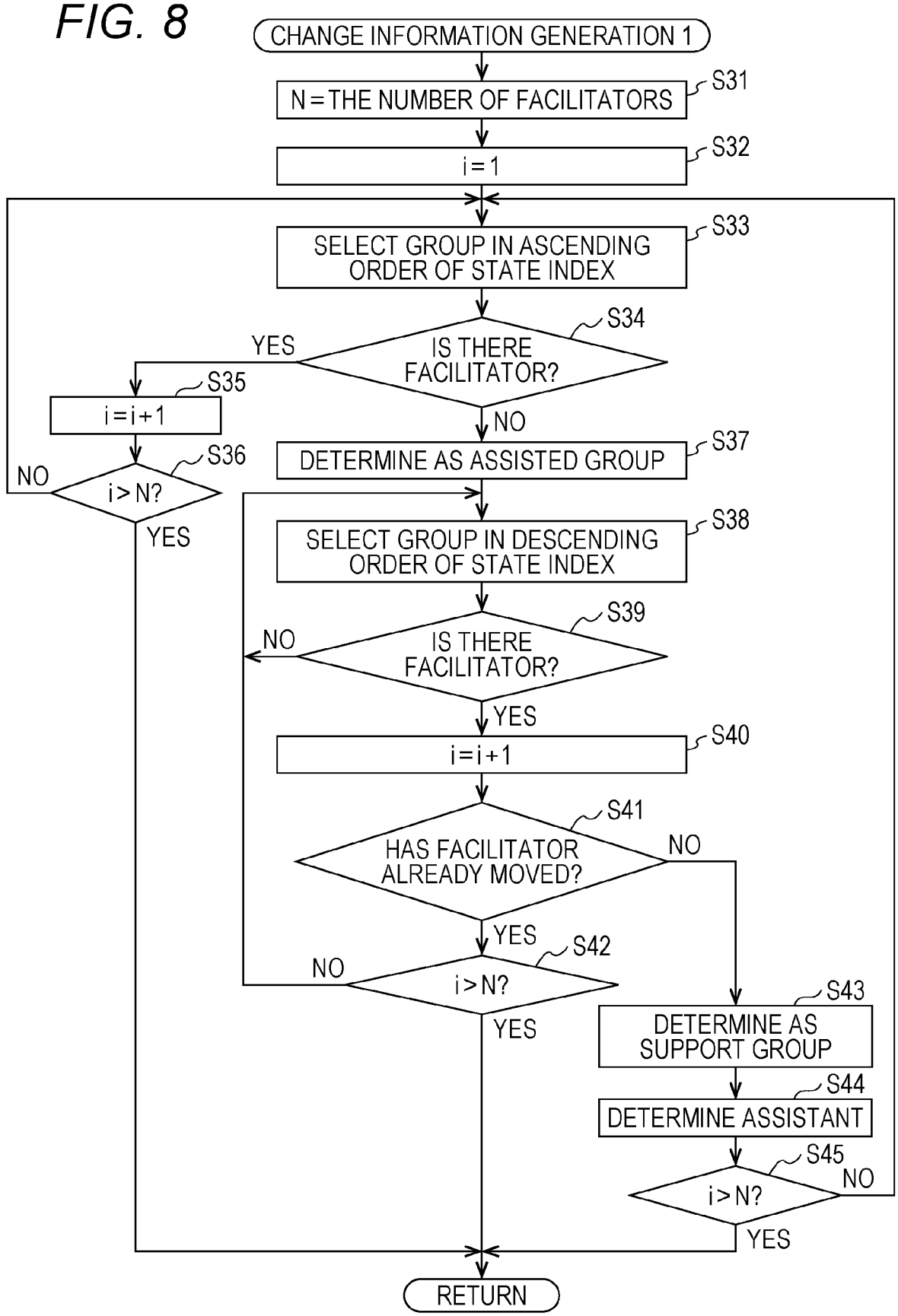
FIG. 8 is a flowchart illustrating an example of a flow of change information generation processing.

FIG. 8 is a flowchart illustrating an example of a flow of the change information generation processing. The change information generation processing is processing executed in step S10 of the group adjustment processing. With reference to FIG. 8, the number of facilitators is set for a constant N (step S31), and the processing proceeds to step S32. One or more of the plurality of participants are determined as a facilitator on the basis of the group information.

In step S32, a variable i is set to "1", and the processing proceeds to step S33. The variable i is a value indicating the number of facilitators to be processed, and is incremented in step S35 or step S40 described later. In step S33, the group to be processed is selected in ascending order of state index among the plurality of groups.

In step S33, the group to be processed is selected in ascending order of state index among the plurality of groups. In the next step S34, it is judged whether or not there is a facilitator in the selected group. If there is a facilitator, the processing proceeds to step S35, and if not, the processing proceeds to step S37. In step S35, the variable i is incremented, and the processing proceeds to step S36. In step S36, it is judged whether or not the variable i is greater than the constant N. If the variable i is greater than the constant N, the processing returns to the group adjustment processing, and if not, the processing returns to step S33.

In step S37, a group selected as the group to be processed is determined as the assisted group, and the processing proceeds to step S38. In step S38, the group to be processed is selected in descending order of state index among the plurality of groups, and the processing proceeds to step S39. In step S39, it is judged whether or not there is a facilitator in the group selected in step S38. If there is a facilitator, the processing proceeds to step S40, and if not, the processing returns to step S38.

In step S40, the variable i is incremented, and the processing proceeds to step S41. In step S41, it is judged whether or not the facilitator belonging to the group selected in step S38 has already moved. The facilitator already determined as the assistant is judged to have moved. If the facilitator has already moved, the processing proceeds to step S42, and if not, the processing proceeds to step S43. In step S42, it is judged whether or not the variable i is greater than the constant N. If the variable i is greater than the constant N, the processing returns to the group adjustment processing, and if not, the processing returns to step S38.

In step S43, the group selected in step S38 is determined as the support group, and the processing proceeds to step S44. In step S44, the facilitator belonging to the support group is determined as the assistant, and the processing proceeds to step S45. In step S45, it is judged whether or not the variable i is greater than the constant N. If the variable i is greater than the constant N, the processing returns to the group adjustment processing, and if not, the processing returns to step S33.

<First Modification>

In the above-described embodiment, at least one of the plurality of groups has a facilitator. The change information generation processing according to a first modification is processing executed in a case where the plurality of groups does not have a facilitator.

Figure 9:
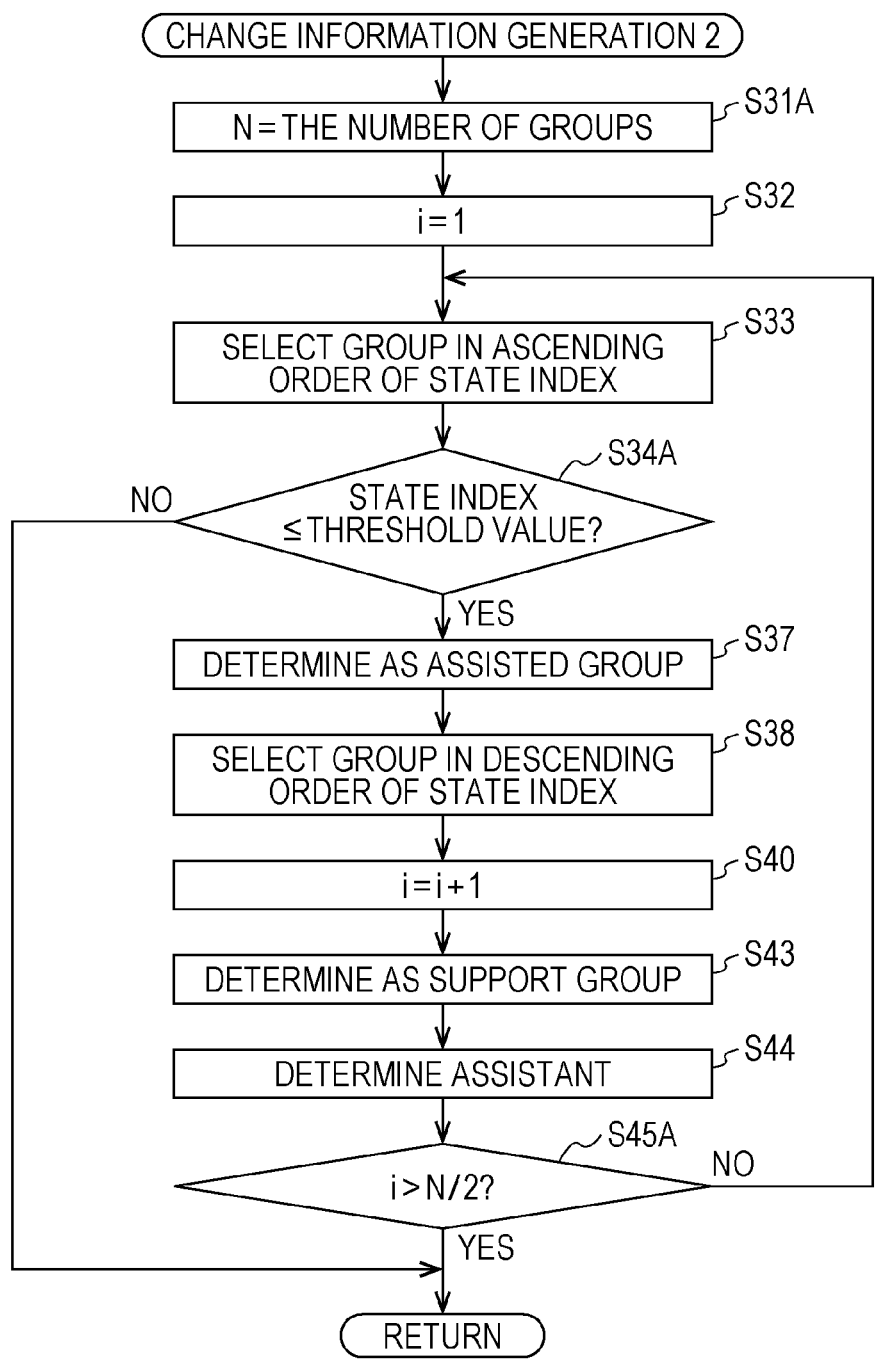
FIG. 9 is a flowchart illustrating an example of a flow of change information generation processing according to a first modification.

FIG. 9 is a flowchart illustrating an example of a flow of change information generation processing according to the first modification. With reference to FIG. 9, the number of groups is set for the constant N (step S31A), and the processing proceeds to step S32.

In step S32, a variable i is set to "1", and the processing proceeds to step S33. The variable i is a value indicating the number of groups to be processed, and is incremented in step S40 described later. In step S33, the group to be processed is selected in ascending order of state index among the plurality of groups, and the processing proceeds to step S34A. In the first period, the group to be processed is selected in ascending order of the first state index, and in the second period, the group to be processed is selected in ascending order of the second state index.

In step S34A, it is judged whether or not the state index is equal to or less than the threshold value. In the first period, the first state index is compared with the first threshold value TH1, and in the second period, the second state index is compared with the second threshold value TH2. If the state index is equal to or less than the threshold value, the processing proceeds to step S37, and if not, the processing returns to the group adjustment processing. In step S37, the group selected, in step S33, to be processed is determined as the assisted group, and the processing proceeds to step S38. In step S38, the group to be processed is selected in descending order of state index among the plurality of groups, and the processing proceeds to step S40. In the first period, the group to be processed is selected in descending order of the first state index, and in the second period, the group to be processed is selected in descending order of the second state index. In step S40, the variable i is incremented, and the processing proceeds to step S43.

In step S43, the group selected in step S38 is determined as the support group, and the processing proceeds to step S44. In step S44, any one of the plurality of participants belonging to the support group is determined as the assistant, and the processing proceeds to step S45A. For example, in both the first period and the second period, the participant having a highest speaking rate is determined as the assistant. In step S45A, it is judged whether or not the variable i is greater than ½ of the constant N. If the variable i is greater than ½ of the constant N, the processing returns to the group adjustment processing, and if not, the processing returns to step S33.

<Second Modification>

In the above-described embodiment, the meeting state includes the first state index and the second state index. The first state index is obtained from the speaking rate of each participant belonging to the group, and the second state index is obtained from the satisfaction level of the participant belonging to the group. The meeting state is not limited thereto.

The meeting state may be measured on the basis of conversation. The meeting state may be determined on the basis of literal information obtained by recognizing audio information of the participants. The meeting state may be determined on the basis of a connection state of each of the PCs 100-1 to N operated by the participants. The meeting information may be determined on the basis of audio of the participants. The meeting state may be determined on the basis of emotions of delight, anger, sorrow, and pleasure of the participants.

<Third Modification>

In the above-described embodiment, the meeting state is judged by using different indicators in two periods of the first period and the second period. The number of periods and the number of indicators are not limited thereto. The meeting state may be judged on the basis of more time periods and more different meeting states.

As described above, according to one aspect of the invention in the present embodiment, the remote-meeting system 1 includes the server 200 and the PCs 100-1 to N, and a plurality of participants can participate a remote meeting by operating the PCs 100-1 to N. The server 200 determines group information related to a plurality of groups each including a plurality of two or more participants, acquires a meeting state indicating a state of a meeting held by each of the plurality of groups, generates change information in which the group information is changed on the basis of the meeting state of each of the plurality of groups, and notifies of a part changed from the group information. For this reason, the participants can be changed between a group of which the meeting state is good and a group of which the meeting state is not good. Because a part changed from the group information is notified, it is possible to prompt a change of two or more participants included in each of the plurality of groups so as to improve the meeting state of the group of which the meeting state is not good. Therefore, the meeting state of each of the plurality of groups can be enhanced, and it is possible to adjust progress of meetings to proceed in a balanced manner among the plurality of groups.

The server 200 determines at least one assistant among the plurality of participants on the basis of the meeting state of each of the plurality of groups, and determines, on the basis of the meeting state of each of the plurality of groups, an assisted group different from the group to which the assistant belongs before the change, among the plurality of groups. Therefore, because the group information is changed such that the assistant belongs to the assisted group, change information in which the group information is changed is easily created.

The meeting state includes the first state index and second state index that indicate a greater value as states of two or more participants included in a group are better, and the server 200 determines, among the plurality of groups in the first period, two target groups having a first state index different from each other, determines one of the participants belonging to one target group that has a higher first state index to be an assistant, and determines another target group that has a lower first state index to be an assisted group. The server, in the second period after the first period, determines two target groups having different second state indices from among the plurality of groups, determines one of the participants belonging to one target group that has a higher second state index to be the assistant, and determines another target group that has a lower second state index to be an assisted group. Therefore, a candidate belonging to the group in which the states of the participants are good can belong to the group in which the states of the participants are not good. Therefore, it is possible to support the group in which the states of the participants are not good to enhance the meeting state of the group. Because the change information is generated on the basis of the first state index in the first period, and the change information is generated on the basis of the second state index in the second period after the first period, the plurality of groups is compared in different states in different periods. Therefore, the plurality of groups can be compared on the basis of meeting states according to progress of the meetings. For example, in a case where the first state index is a level of activeness in a meeting, and the second state index is satisfaction levels of the participants, it is possible to support a group having a less lively discussion to have an active discussion in the first period, and to support a group having difficulty to settle a discussion among the plurality of participants to settle the discussion in the second period.

The plurality of participants includes a predetermined facilitator (assistant candidate), and the server 200 determines the one target group from among one or more groups having a facilitator, and determines the another target group from among one or more groups having no facilitator. Therefore, it is easy to determine the assistant and the assisted group.

The server 200 determines a group having the highest state index among one or more groups having an assistant candidate to be the one target group, and determines a group having the lowest state index among one or more groups having no assistant candidate to be the another target group. For example, the server 200 determines a group having the highest state index among one or more groups having a facilitator to be the support group having the assistant, and determines a group having the lowest state index among one or more groups having no assistant facilitator to be the assisted group. Therefore, it is easy to determine the assistant and the assisted group.

The server 200 judges a meeting state of each of the plurality of groups at predetermined time intervals. Therefore, the group information can be changed according to the meeting state that changes with time.

The server 200 generates change information in response to the meeting state of any one of the plurality of groups becoming a predetermined state. Specifically, the server 200 generates change information in a case where the first state index of any one of the plurality of groups is equal to or less than the first threshold value TH1 in the first period, and in a case where the second state index of any one of the plurality of groups is equal to or less than the second threshold value TH2 in the second period. Therefore, the group information can be changed according to the meeting state that changes with time.

The server 200 stores history information including a set of group information and a meeting state in the HDD 204, and learns the first threshold value TH1 and the second threshold value TH2 by using the history information as training data. Therefore, the group information can be changed at an appropriate timing.

The server 200 acquires the meeting state on the basis of audio of each of the plurality of participants or/and an image obtained by capturing an image of the face of each of the participants. Therefore, the meeting state can be appropriately acquired.

Although embodiments of the present invention have been described and illustrated in detail, the disclosed embodiments are made for purposes of illustration and example only and not limitation. The scope of the present invention should be interpreted by terms of the appended claims, and is intended to include all modifications in the meaning equivalent to the scope of the claims and within the scope of the claims.

What is claimed is:

1. A remote-meeting system that allows a plurality of participants to participate in a remote meeting, the remote-meeting system comprising a hardware processor that:
   determines group information related to a plurality of groups, each of which including a plurality of two or more the participants;
   acquires a meeting state indicating a state of a meeting held by each of a plurality of the groups;
   generates change information obtained by changing the group information on the basis of the meeting state of each of a plurality of the groups; and
   notifies of a part changed from the group information,
   wherein the hardware processor determines at least one assistant among a plurality of the participants on the basis of the meeting state of each of a plurality of the groups, and determines, on the basis of the meeting state of each of a plurality of the groups, an assisted group different from the group to which the assistant belongs before the change, among a plurality of the groups.

2. The remote-meeting system according to claim 1,
   wherein the meeting state includes a state index that indicates a greater value as states of two or more the participants included in the group are better, and
   the hardware processor determines, among a plurality of the groups, two target groups having the state index different from each other, determines one of the participants belonging to one the target group that has a higher the state index to be the assistant, and determines another the target group that has a lower the state index to be the assisted group.

3. The remote-meeting system according to claim 2,
   wherein the state index includes a first state index and a second state index that indicate a state different from each other, and
   the hardware processor generates the change information on the basis of the first state index in a first period, and generates the change information on the basis of the second state index in a second period after the first period.

4. The remote-meeting system according to claim 2,
   wherein a plurality of the participants includes a predetermined assistant candidate, and
   the hardware processor determines one the target group among one or more the groups having the assistant candidate and determines another the target group among one or more the groups that do not have the assistant candidate.

5. The remote-meeting system according to claim 4,
   wherein the hardware processor determines the group having a highest the state index among one or more the groups having the assistant candidate to be one the target group, and determines the group having a lowest the state index among one or more the groups that do not have the assistant candidate to be another the target group.

6. The remote-meeting system according to claim 1,
   wherein the hardware processor judges the meeting state of each of a plurality of the groups at predetermined time intervals.

7. The remote-meeting system according to claim 1,
   wherein the hardware processor generates the change information in response to the meeting state of any one of a plurality of the groups becoming a predetermined state.

8. The remote-meeting system according to claim 7, the remote-meeting system further comprising:
   a history storage that stores history information including a set of the group information and the meeting state; and
   a learner that learns the predetermined state by using the history information as training data.

9. The remote-meeting system according to claim 1,
   wherein the hardware processor acquires the meeting state on the basis of audio of each of a plurality of the participants or/and an image obtained by capturing an image of the face of the participant.

10. A remote-meeting method executed by a computer that provides a remote-meeting service that allows a plurality of participants to participate in a remote meeting, the remote-meeting method comprising:
    determining group information related to a plurality of groups, each of which including a plurality of two or more the participants;
    acquiring a meeting state indicating a state of a meeting held by each of a plurality of the groups;
    generating change information obtained by changing the group information on the basis of the meeting state of each of a plurality of the groups;
    notifying of a part changed from the group information; and
    determining at least one assistant among a plurality of the participants on the basis of the meeting state of each of a plurality of the groups, and determining, on the basis of the meeting state of each of a plurality of the groups, an assisted group different from the group to which the assistant belongs before the change, among a plurality of the groups.

11. A non-transitory recording medium storing a computer readable remote-meeting program executed by a computer that provides a remote-meeting service that allows a plurality of participants to participate in a remote meeting, the remote-meeting program comprising:
    determining group information related to a plurality of groups, each of which including a plurality of two or more the participants;
    acquiring a meeting state indicating a state of a meeting held by each of a plurality of the groups;
    generating change information obtained by changing the group information on the basis of the meeting state of each of a plurality of the groups;
    notifying of a part changed from the group information; and
    determining at least one assistant among a plurality of the participants on the basis of the meeting state of each of a plurality of the groups, and determining, on the basis of the meeting state of each of a plurality of the groups, an assisted group different from the group to which the assistant belongs before the change, among a plurality of the groups.

* * * * *